US011864287B1

(12) United States Patent
Choy et al.

(10) Patent No.: US 11,864,287 B1
(45) Date of Patent: Jan. 2, 2024

(54) 0-10 VOLT DIMMING FOR AC-POWERED LED LIGHTS

(71) Applicant: Wangs Alliance Corporation, Port Washington, NY (US)

(72) Inventors: Wai Ho Choy, Mineola, NY (US); Yumeng Sha, Little Neck, NY (US); Haisheng Zhou, Hengnan County (CN); Wei Gao, Guangzhou (CN)

(73) Assignee: Wangs Allliance Corporation, Port Washington, NY (US)

( * ) Notice: Subject to any disclaimer, the term of this patent is extended or adjusted under 35 U.S.C. 154(b) by 0 days.

(21) Appl. No.: 18/203,844

(22) Filed: May 31, 2023

Related U.S. Application Data

(60) Provisional application No. 63/400,489, filed on Aug. 24, 2022.

(51) Int. Cl.

| | |
|---|---|
| ***H05B 45/325*** | (2020.01) |
| ***H05B 45/3725*** | (2020.01) |
| ***H05B 45/10*** | (2020.01) |
| ***H05B 47/175*** | (2020.01) |

(52) U.S. Cl.

CPC ........... *H05B 45/325* (2020.01); *H05B 45/10* (2020.01); *H05B 45/3725* (2020.01); *H05B 47/175* (2020.01)

(58) Field of Classification Search

CPC .. H05B 45/3725; H05B 45/10; H05B 47/175; H05B 47/19; H05B 35/00; H05B 45/385; H05B 47/195; H05B 45/382; H05B 45/12; H05B 45/18; H05B 45/20; H05B 45/30; H05B 45/31; H05B 45/315; H05B 45/325; H05B 45/34; H05B 45/3578; H05B 45/36; H05B 45/375; H05B 45/392; H05B 45/395; H05B 47/10; H05B 47/11; H05B 47/12; H05B 47/125; H05B 47/13; H05B 47/14; H05B 47/18; H05B 47/185; F21V 23/0428; F21S 8/06; F21S 8/065; F21S 10/005; F21S 2/005; F21S 8/066; F21S 8/081; F21Y 2115/10; Y02B 20/30

See application file for complete search history.

(56) References Cited

U.S. PATENT DOCUMENTS

| | | | | |
|---|---|---|---|---|
| 2007/0222399 A1* | 9/2007 | Bondy | ...................... | F21S 2/00 315/291 |
| 2011/0115399 A1* | 5/2011 | Sadwick | .............. | H05B 45/385 315/287 |
| 2019/0098734 A1* | 3/2019 | Dolan | .................... | H05B 47/19 |

* cited by examiner

*Primary Examiner* — Monica C King

(74) *Attorney, Agent, or Firm* — Weiss & Arons LLP

(57) ABSTRACT

Circuitry to control dimming of a load circuit may be connected between a 0-10 V dimmer that outputs a DC voltage control signal and the load circuit. The circuitry may include a microcontroller that may be programmed to generate a first pulse-width modulated ("PWM") signal having a duty cycle based on the dimming level configured to be set on the dimmer. A voltage conversion circuit may supply the microcontroller with data relating to the set dimming level. The microcontroller may be programmed to synchronize the first PWM signal with the supplied AC power from the main circuit based on a second PWM signal from a voltage detection circuit, such as a zero crossing voltage detection circuit. The first PWM signal may be supplied from the microcontroller to an on/off switch to chop the AC power waveform at certain intervals and thereby dim the load.

24 Claims, 12 Drawing Sheets

0-10 VOLT DIMMING FOR AC-POWERED LED LIGHTS

CROSS-REFERENCE TO RELATED APPLICATION

This is a nonprovisional application of U.S. Provisional Application No. 63/400,489, filed Aug. 24, 2022, which is hereby incorporated by reference herein in its entirety.

BACKGROUND

A 0-10 V dimmer is one of several types of dimmers that may be used to control lighting levels. A 0-10 V dimmer outputs a DC voltage signal between 0 and 10 volts. A 0-10 V dimmer may provide a smooth dimming operation to control low voltage direct current (DC) powered lighting. A 0-10 V dimmer may be unsafe, however, without additional circuitry, to control AC-powered loads or devices having higher voltages, such as voltages of 110V or more. Still, some may have a preference to use a 0-10 V dimmer to control devices, such as a load circuit that is configured to receive alternating current (AC) power and may include LED lights.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

Figure 1:
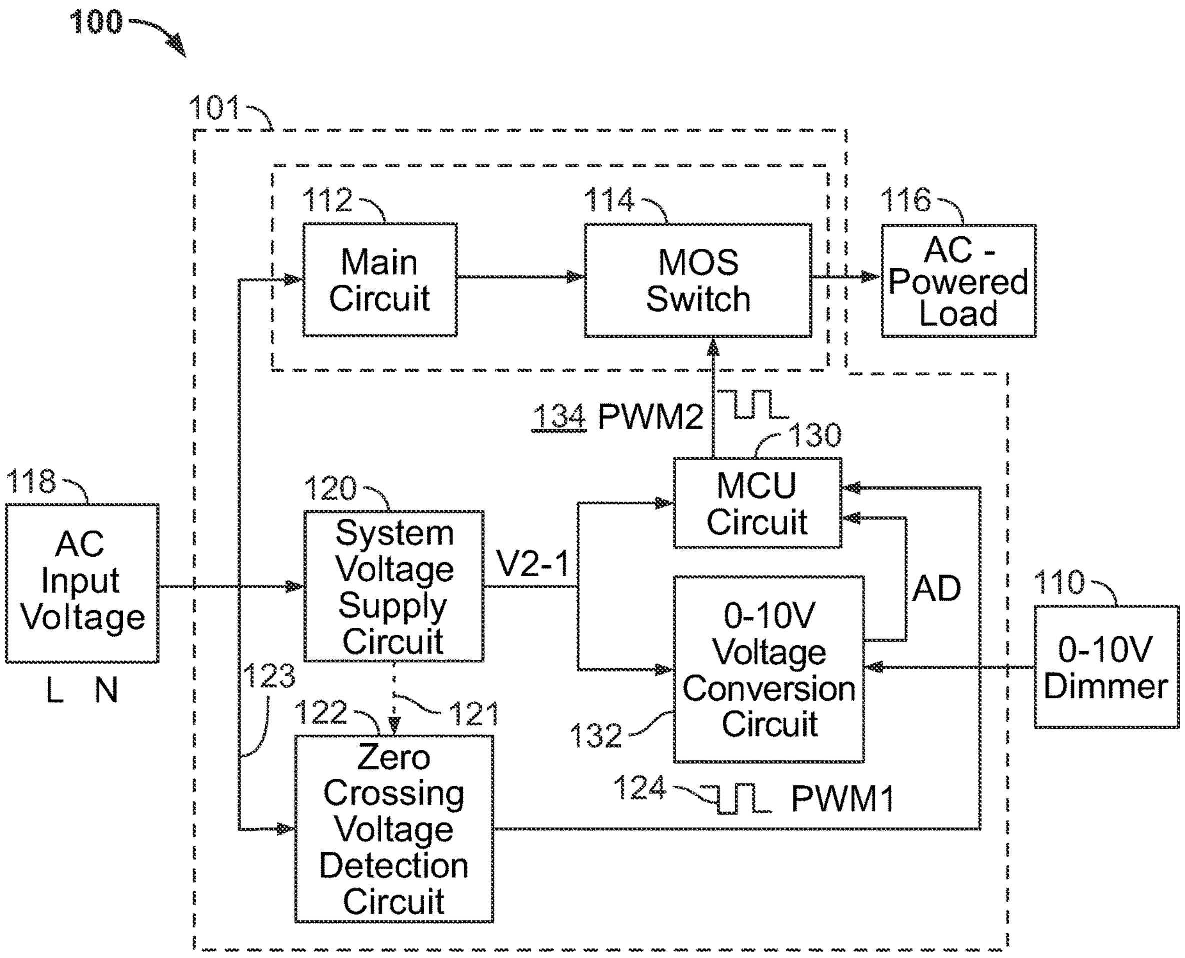
FIG. 1 shows schematically an illustrative system architecture in accordance with principles of the invention.
Figure 2:
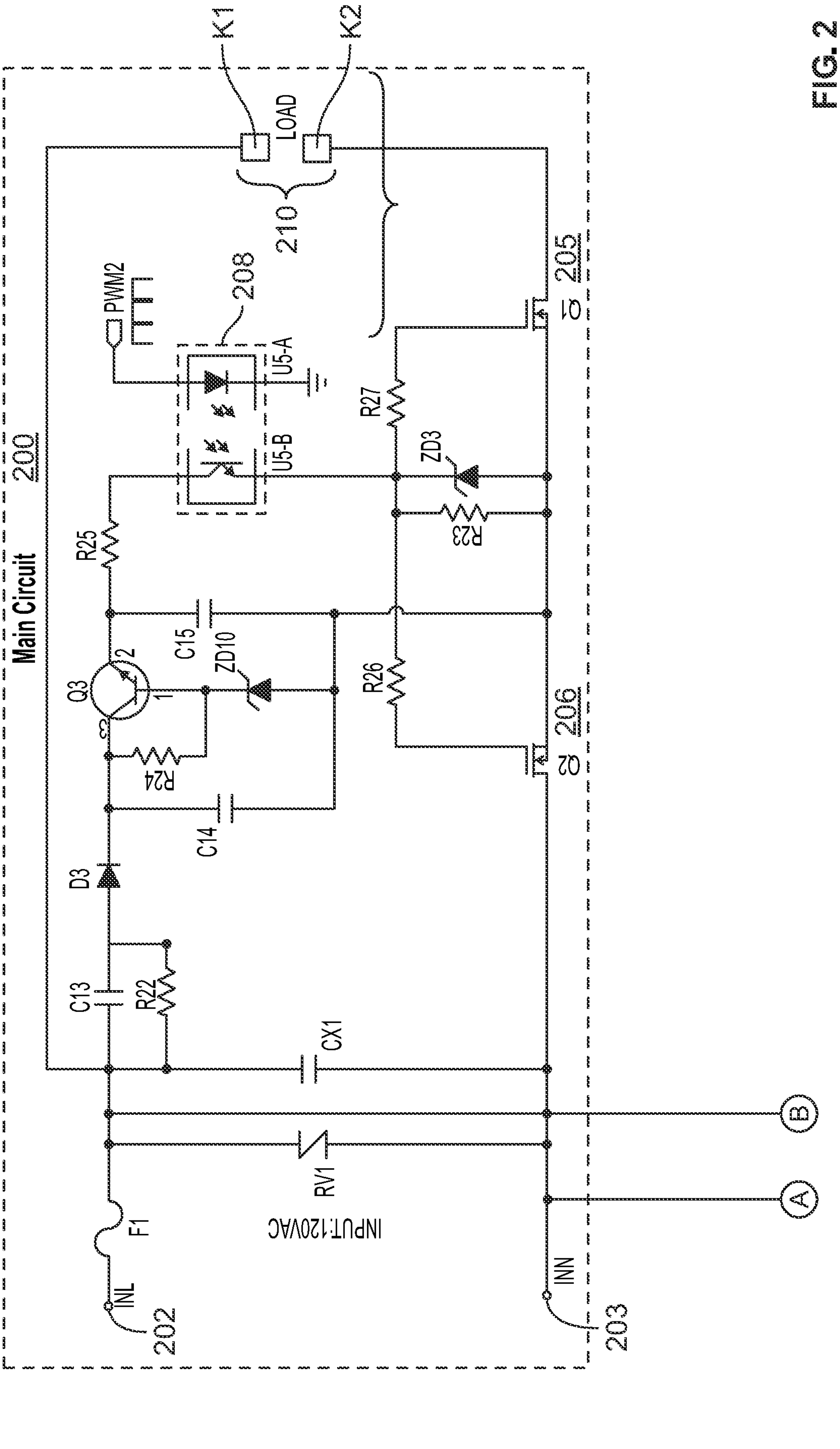
FIG. 2 shows schematically an illustrative circuit in accordance with principles of the invention.
Figure 3:
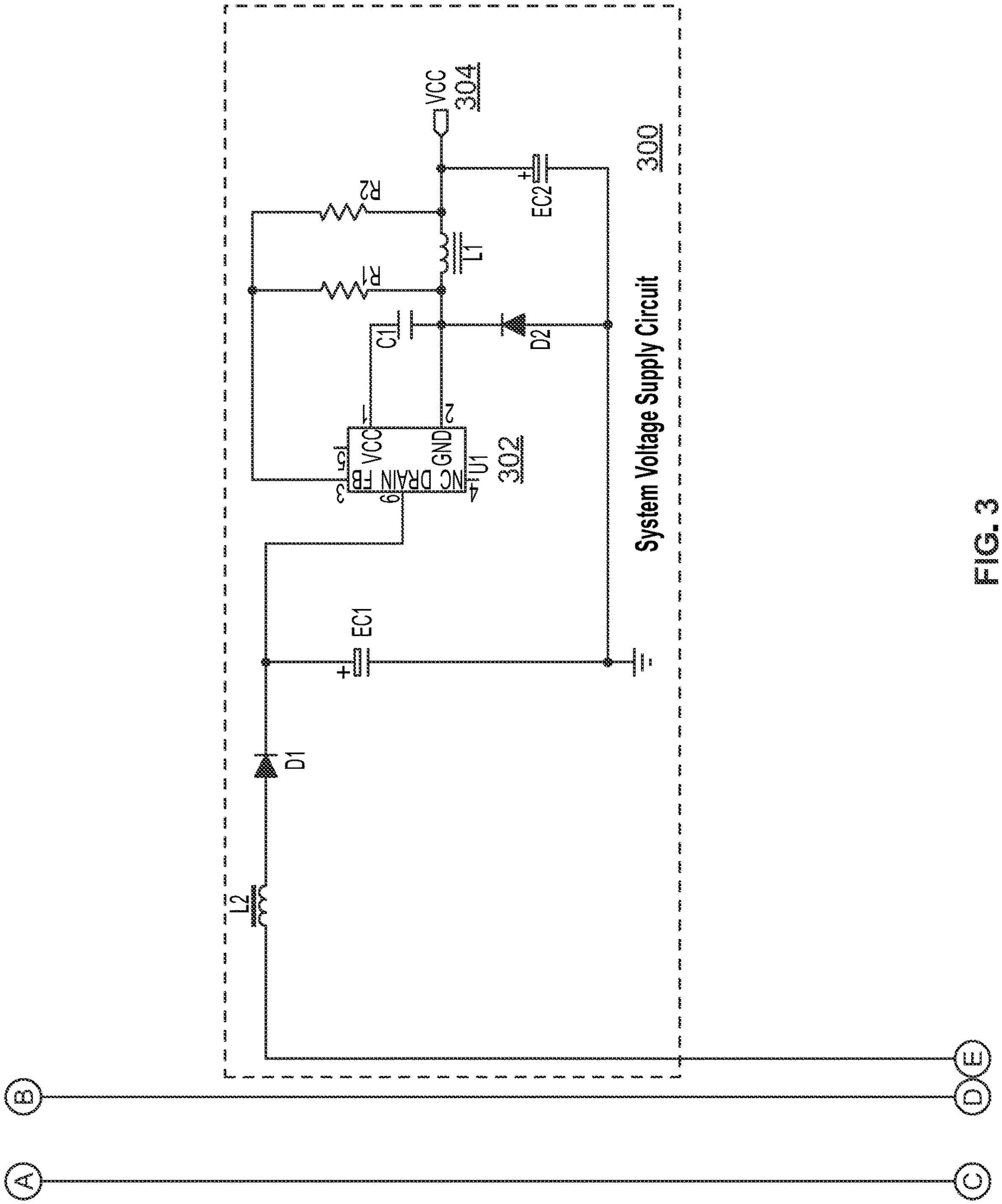
FIG. 3 shows schematically an illustrative circuit in accordance with principles of the invention.
Figure 4:
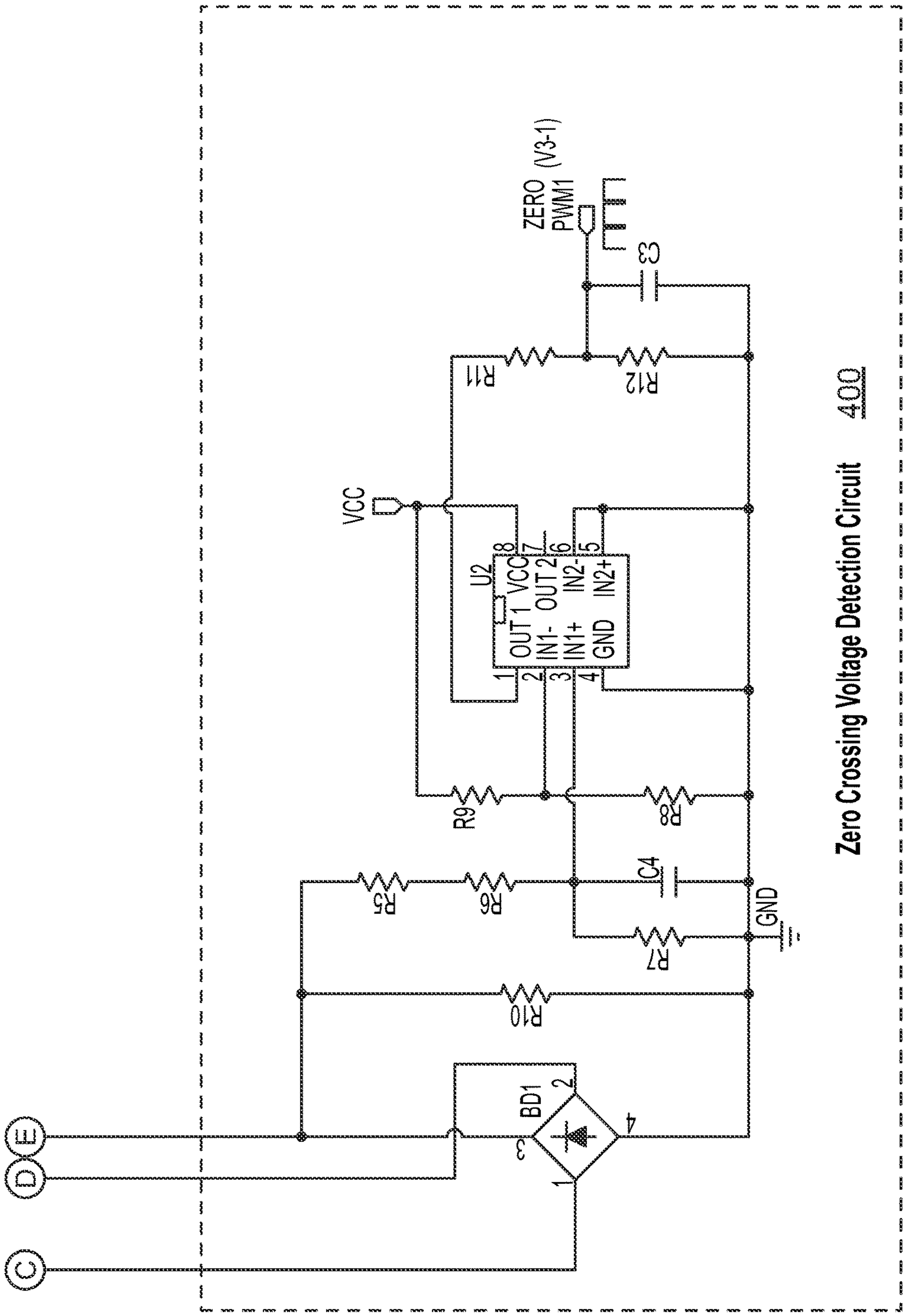
FIG. 4 shows schematically an illustrative circuit in accordance with principles of the invention.
Figure 5:
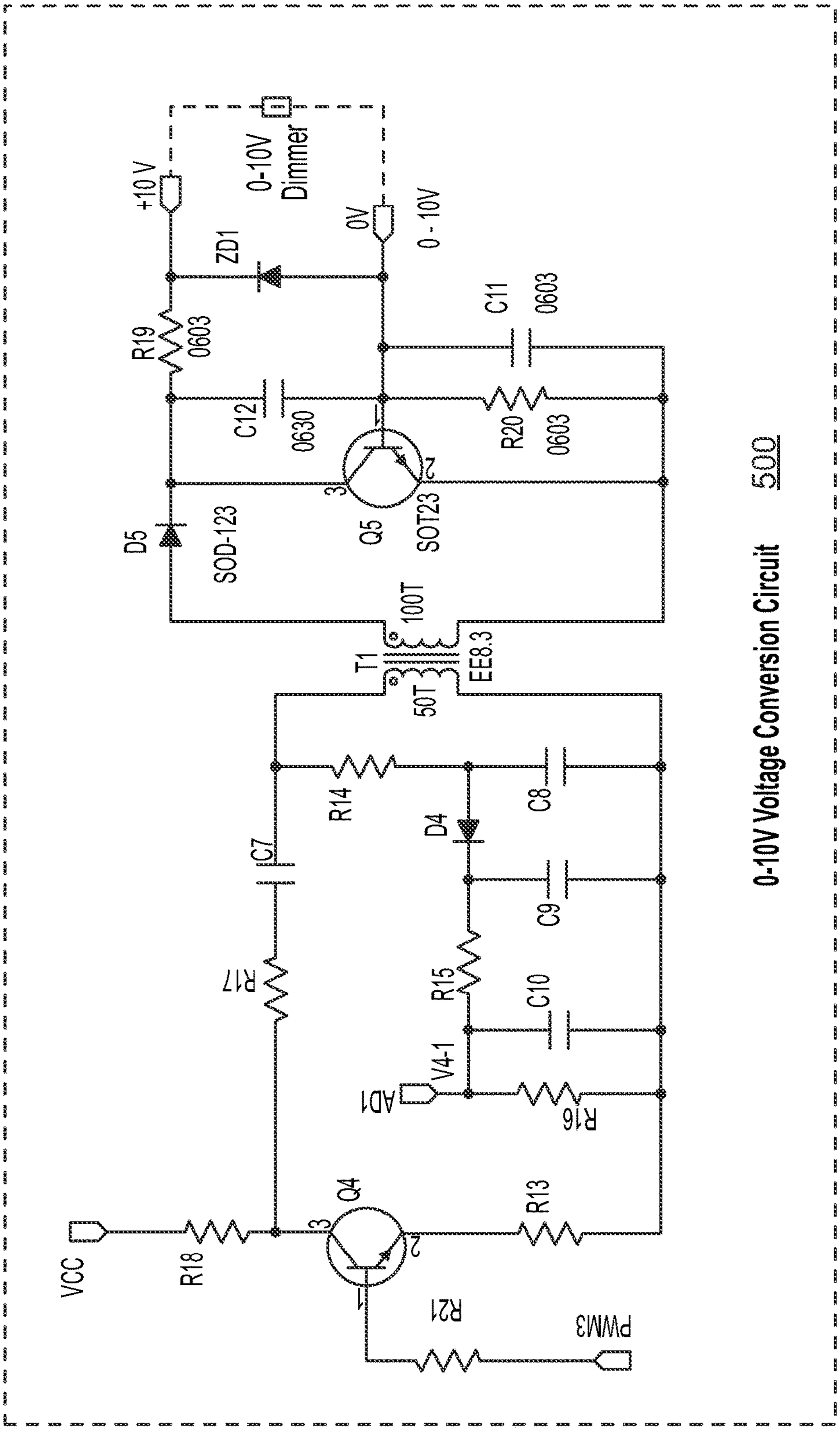
FIG. 5 shows schematically an illustrative circuit in accordance with principles of the invention.
Figure 6:
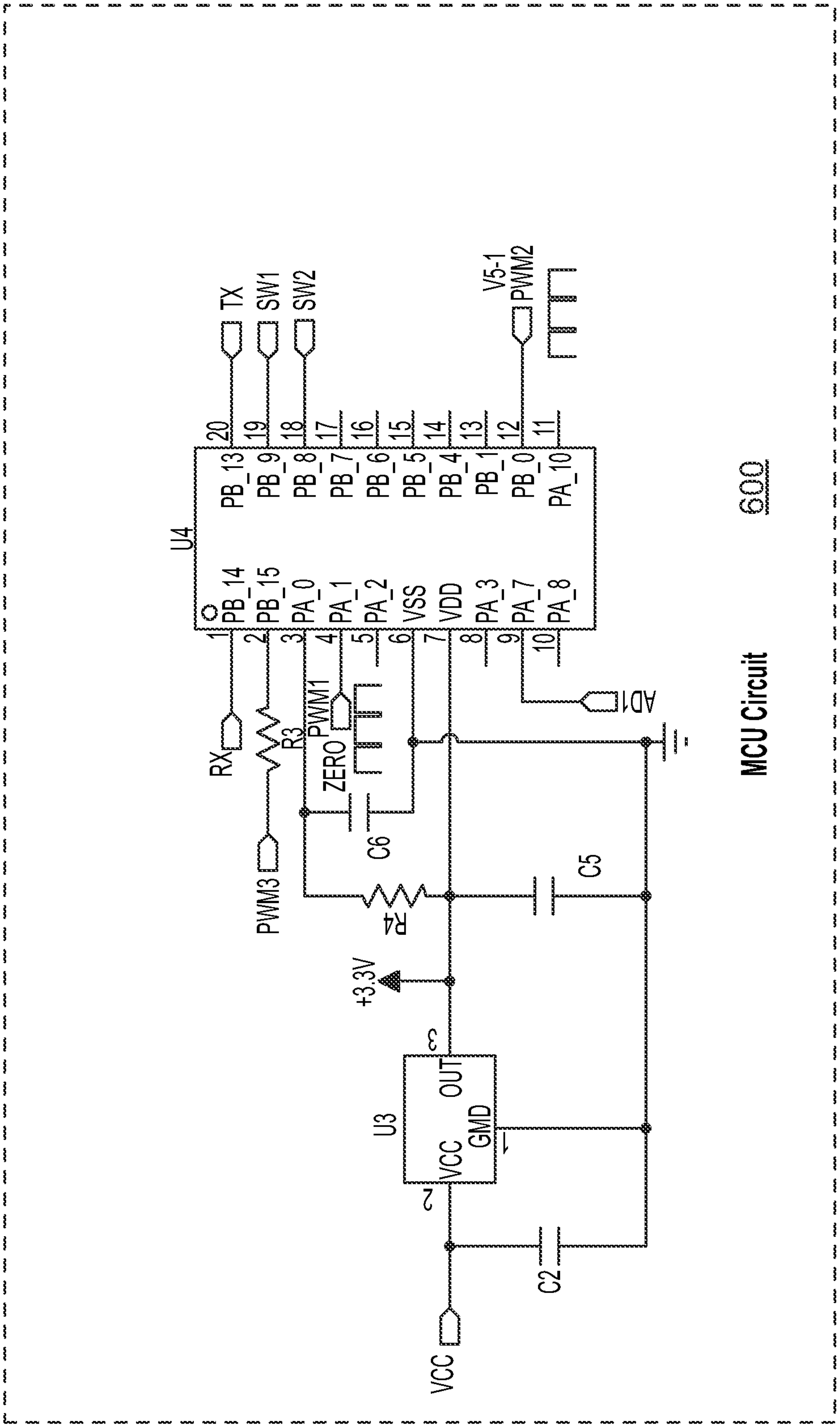
FIG. 6 shows schematically an illustrative circuit in accordance with principles of the invention.

The leftmost digit (e.g., "L") of a three-digit reference numeral (e.g., "LRR"), and the two leftmost digits (e.g., "LL") of a four-digit reference numeral (e.g., "LLRR"), generally identify the first figure in which a part is called-out.

DETAILED DESCRIPTION

Apparatus and methods for controlling dimming of an AC-powered load by a dimmer that outputs a DC voltage control signal are provided. The dimmer may be a 0-10 V dimmer. The apparatus may include a voltage conversion circuit. The apparatus may include a switch. The voltage conversion circuit may be configured to generate a digital output based on a dimming level configured to be set on the dimmer, such as a 0-10 V dimmer, that outputs a DC voltage control signal. The switch may control, based on the digital output, AC power that is supplied to a load circuit. The load circuit may be configured to receive AC power.

The voltage conversion circuit may include a 0-10 V voltage conversion circuit. The voltage conversion circuit may include an A/D converter that is configured to generate the digital output by sampling the dimming level.

The apparatus may include a microcontroller ("MCU"). The MCU may be in communication with the voltage conversion circuit. The MCU may include a first input terminal. The MCU may include an output terminal. The first input terminal may be configured to receive the digital output as a first input. The output terminal may be configured to output a first pulse-width modulated ("PWM") signal to the switch. The first PWM signal may be based on the digital output. The first PWM signal may have a duty cycle that corresponds to an amount by which the load circuit is dimmed.

The switch may include a MOSFET switch. The MOSFET switch may be controlled by the MCU to turn on or off. The on/off control may be based on the first PWM signal. The MOSFET switch may include a MOSFET tube. The MOSFET tube may be configured to chop AC power supplied to the load circuit based on the duty cycle of the first PWM signal.

The apparatus may include a system voltage supply to supply power to the voltage conversion circuit and the MCU. The voltage conversion circuit may be configured to electrically isolate the 0-10 V dimmer from the system voltage supply.

The apparatus may include a main circuit that includes a switch for ON/OFF control of AC power to the load circuit. The main circuit may include an optocoupler configured to transmit to the switch the first PWM signal. The main circuit may be AC-powered.

The apparatus may include a voltage detection circuit, which may be a zero-crossing voltage detection circuit. The system voltage supply may be configured to supply power to the voltage detection circuit. The voltage detection circuit may be configured to output a second PWM signal based on an AC voltage that is input to the voltage detection circuit and to transmit the second PWM signal to the MCU. The MCU may include a second input terminal that is configured to receive, as a second input, the second PWM signal from the voltage detection circuit. The first PWM signal may be based on the first input. The first PWM signal may be based on the second input. The MCU may be programmed to use the second PWM signal to synchronize the first PWM signal with the AC power.

The apparatus may be configured to receive alternating current, and to divide the alternating current into three channels, including a first channel configured to provide power to the load circuit via the switch, a second channel configured to provide power to a system voltage supply, and a third channel configured to provide an AC signal to the voltage detection circuit.

The MCU may be programmed to provide a correlation between dimming of the load circuit and the dimming level. The correlation may be continuous. The correlation may be linear. The correlation may be non-linear. The correlation may be continuous over a range of settings on the 0-10 V dimmer. The correlation may be discontinuous over a range of settings on the 0-10 V dimmer.

The apparatus may include the load circuit. The load circuit may include a fixture. The fixture may include a DC device and may include a light source, which may include a light-emitting diode. The load circuit may include lights.

The apparatus may include a housing that encloses the voltage conversion circuit, and the switch. The apparatus may be located in a fixture canopy.

The apparatus may be a module that is part of a larger apparatus. For example, the apparatus may be a dimming apparatus that may be included as a module within a fixture. A dimmer may be connected to the larger apparatus that includes the dimming apparatus for controlling the fixture. The fixture may include a light fixture. The light fixture may include LED lights. The fixture may include a ceiling fan to which a light fixture may be connected.

As another example, a dimming apparatus may be included as a module along with a dimmer that outputs a DC voltage signal. A fixture may then be connected to the larger apparatus that includes the dimmer and the dimming apparatus in accordance with the present invention.

A solution for dimming AC-powered lights using a 0-10 V dimmer may include electrically isolating a 0-10 V dimmer from an AC-powered load that powers the AC-powered lights. A 0-10 V voltage conversion circuit may be configured to sample the 0-10 V dimming signal that is received from a 0-10 V dimmer and may transmit the sampled signal to an MCU circuit. The MCU circuit may receive a PWM signal that is generated by sampling the zero-crossings of an AC input voltage, such as a 120V input. The MCU circuit may generate another PWM signal based on at least two input signals, including the signal received from the 0-10 V dimmer and the PWM signal generated by sampling of the zero-crossings. The PWM signal output from the MCU circuit may have a duty cycle that may be used to control the conduction angle of the input voltage, which may be, for example, AC120V, AC240V or some other voltage above to achieve a dimming of the AC-powered lights.

The dimming apparatus may include one or more of a voltage conversion circuit, an MCU circuit, system voltage power supply circuitry, a voltage detection circuit, a main circuit, and a switch. The switch may be included within the main circuit.

A voltage conversion circuit, such as a 0-10 V voltage conversion circuit, may generate a digital output based on the dimming level set on a 0-10 V dimmer. The voltage conversion circuit may function as an isolation circuit to isolate the 0-10 V dimmer from the AC power. The dimmer may be used to specify a dimming level of an AC-powered load that may be connected to the dimming apparatus. The AC-powered load may be a fixture. The fixture may be a light fixture. The fixture may include a DC device, such as DC-powered lights. The fixture may include AC-powered lights. The lights may include one or more LED lights.

An MCU circuit may communicate with the 0-10 V voltage conversion circuit.

System voltage power supply circuitry may supply AC power to the 0-10 V voltage conversion circuit and the microcontroller.

A voltage detection circuit may output a PWM signal based on an AC input voltage and transmits that PWM signal to the microcontroller. The voltage detection circuit may be a zero crossing voltage detection circuit.

A main circuit may include the switch. The switch may be configured to be used for on/off control of AC power to an AC-powered load connected to the dimming apparatus based on a signal from the microcontroller. The switch may be configured, such as with a MOS tube, to chop the supplied power from the main circuit to dim the AC-powered load based on an output from the microcontroller.

The microcontroller may have a first input that is configured to receive the digital output of the 0-10 V voltage conversion circuit. The microcontroller may have a second input that is configured to receive the PWM signal from the voltage detection circuit. The microcontroller may have an output that is configured to output the signal that may be provided to the switch.

The invention is further illustrated with reference to FIGS. 1-12.

FIG. 1 shows illustrative system architecture 100. Dimming apparatus 101 may be used to dim a load of an AC-powered load circuit 116. The AC-powered load circuit 116 may include, for example, a fixture, such as a light fixture. AC-powered load circuit 116 may be AC-powered while elements, such as LED lights, within the load circuit 116 may be DC-powered, such as by including an AC/DC converter in the AC-powered load circuit 116. Dimming apparatus 100 may be an apparatus separate from AC-powered load circuit 116 or may be included with AC-powered load circuit 116. Where AC-powered load circuit 116 is separate from dimming apparatus 100, the dimming apparatus 100 may be used with one or more AC-powered load circuits 116, which may include different AC-powered loads. An AC input voltage 118 may supply AC power to dimming apparatus 100.

Dimming apparatus 100 may include one or more of main circuit 112, system voltage supply circuit 120, and zero crossing detection circuit 122. The AC power from AC input voltage 118 may include a line voltage. The line voltage may be divided into three channels. A first channel may be configured to provide power to AC-powered load circuit 116 via a switch, such as MOS switch 114. MOS switch 114 may be separate from or included in main circuit 112. A second channel may be configured to provide power to system voltage supply circuit 120. A third channel may be configured to provide an AC signal to the voltage detection circuit 122, which may a zero crossing detection circuit 122.

Rather than provide a third channel to voltage detection circuit 122 directly via connection 123, voltage detection circuit 122 may be powered by system voltage supply circuit 120 that receives the second channel and provide the third channel to voltage detection circuit 122 via a connection shown as dashed line 121.

MOS switch 114 (e.g., a metal oxide semiconductor field effect transistor—MO SFET switch) may be an on/off switch that controls whether AC power from main circuit 112 is supplied to AC-powered load circuit 116. When MOS switch 114 is on, AC power from main circuit 112 may be output to AC-powered load circuit 116. AC-powered load circuit 116 may be configured to receive the AC power and may provide power to a load. The load may be a fixture that includes lights.

The output of system voltage supply circuit 120 may be supplied to a 0-10 V voltage conversion circuit 132. The output of the system voltage supply circuit 120 may be supplied to MCU circuit 130. The output of the 0-10 V voltage conversion circuit 132 may be supplied to MCU circuit 130. The output of the zero crossing voltage detection circuit 122 may be PWM1 signal 124 that is input to MCU circuit 130. The output of MCU circuit 130 may be input to MOS switch 114. The output of the MCU circuit 114 may be PWM2 signal 134.

FIGS. 2 to 6 show schematics of one or more illustrative circuits that may be included in the 0-10 V dimming apparatus 100. The circuits may be implemented on one or more circuit boards such as a printed circuit board (PCB). The PCB may include one or more of the components shown in FIG. 1.

Illustrative circuit 200 may correspond to main circuit 112 and MOS switch 114. Circuit 300 may correspond to system voltage supply circuit 120. Illustrative circuit 400 may correspond to zero crossing voltage detection circuit 122. Illustrative circuit 500 may correspond to 0-10 V voltage conversion circuit 132. Illustrative circuit 600 may correspond to MCU circuit 130.

Main circuit 200 may include an input of a line voltage, such as 120V AC between terminals 202, 203, a varistor (voltage dependent resistor RV1 to protect against high voltage surges), and other illustrative circuitry including R22, R23, R24, R25, R26, R27, C13, C14, C15, CX1, D3, ZD3, and ZD10, that may be connected as shown.

Main circuit 200 may include a MOS switch 208 which may correspond to MOS switch 114 of FIG. 1. A MOS tube may include MOSFET transistors Q1, Q2 (205, 206) that may serve as the MOS switch. (MOS switch 114 is illustrated as a separate block from the main circuit in FIG. 1.) Q1 and Q2 may chop portions of the positive and negative phases, respectively, of an AC waveform during intervals when the respective Q1 or Q2 transistors are off so that no AC power is supplied to AC-powered load circuit 116 during those intervals. Q1 and Q2 may be off during "off" portions of pulse-width modulated signal PWM2. Circuit 200 may include a connector 210 (including K1 and K2) for an AC-powered load circuit. Circuit 1 may include an opto-coupler U5 (shown as U5-A and U5-B) that enables transmission of an electrical signal between LED U5-A and photodetector U5-B while maintaining electrical isolation between MCU circuit 130 and main circuit 200. Q3 is a transistor that may supply a voltage for controlling MOS switch 114 and may provide a constant voltage across capacitor C15 when transistor Q3 is on.

System voltage supply circuit 300 may correspond to system voltage supply circuit 120 in FIG. 1. Circuit 30 may include one or more integrated circuit chips, such as chip U1, and other components including L1, L2, D1, D2, EC1, EC2, C1, R1, R2 that may be connected as shown. System voltage supply circuit 300 may supply power indicated by Vcc to voltage detection circuit 122, MCU circuit 130 and 0-10 V voltage conversion circuit 132.

Zero crossing voltage detection circuit 400 may correspond to zero crossing detection circuit 122 in FIG. 1 and may include comparator U2, and other components including BD1, R5, R6, R7, R9, R10, R11, R12, C3, C4, that may be connected as shown. Voltage detection circuit 400 may output pulse-width modulated signal PWM1 to 0-10 V MCU circuit 600 shown in FIG. 6.

0-10 V voltage conversion circuit 500 may correspond to 1-10 voltage conversion circuit 132 in FIG. 1. Circuit 500 may sense a voltage setting on a 0-10 V dimmer and convert the sensed signal to a digital signal AD1 that is output to the MCU control circuit in FIG. 6. Circuit 500 may include switch Q4, transformer T1, and a peripheral circuit that may include R13, R14, R15, R17, R18, R19, R20, R21, C7, C8, C9, C10, C11, C12, D4, D5, ZD1, and switch Q5.

MCU circuit 600 may include a linear regulator U3. MCU circuit 600 may include the illustrated MCU U4. MCU circuit 600 may include a peripheral circuit. A third PWM signal PWM3 may be output from the MCU circuit 600 (e.g., from pin 2) and input to the 0-10 V voltage conversion circuit 500 to power the 0-10 V voltage conversion circuit 500.

Dimming apparatus 100 may perform one or more of the functions below:

a. Alternating current from the power grid may enter through L (line) and N (neutral) phase lines, shown as 202, 203 in FIG. 2, and may be divided into three channels.

b. The first channel may pass through the MOS switch 114 to provide power to the AC-powered load circuit 116 and maintain the normal operation of the AC-powered load circuit.

c. The second channel may be supplied to system voltage supply circuit 120. System voltage supply circuit 120 may output a DC voltage signal V2-1 (Vcc) having an amplitude of 12V. Voltage signal V2-1 may supply power to MCU circuit 600 to maintain the normal operation of MCU circuit 600. Voltage signal V2-1 may supply power to 0-10 V voltage conversion circuit 500 to maintain the normal operation of 0-10 V voltage conversion circuit 500.

d. The third channel may pass through zero crossing voltage detection circuit 400 and may obtain the square wave voltage signal V3-1 (PWM1) at the output of pin 1 of comparator U2. PWM1 may be transferred to pin 4 of the microcontroller U4 after partial voltage reduction by resistors R11 and R12.

e. 0-10 V voltage conversion circuit 500 may obtain a voltage signal V4-1 at both ends of capacitor C10. Voltage signal V4-1 may be converted from an analog to digital signal and output as voltage signal AD1 from circuit 500 to circuit 600 (e.g., pin 9 of microcontroller U4).

f. MCU circuit 600 may sample the voltage V2-1 (Vcc) of system voltage supply circuit 300 and the voltage V3-1 (PWM1) of zero crossing voltage detection circuit 400. Based on the two sampled signals, a PWM voltage output signal V5-1 (PWM2) may be generated through an algorithm programmed in the MCU. PWM2 has a duty cycle that may control the conduction time of the MOS tube Q1, Q2 205, 206 through the optocoupler U5 208 in main circuit 200 to achieve dimming of lights, such as the LED lights in an AC-powered load circuit.

g. The MCU may be an application-specific or general-purpose microcontroller with a programmable memory that can store algorithms and control other parts of the circuitry. The MCU may be specific to lighting control. The microcontroller may have an algorithm to provide precision control of the dimming of lights in the AC-powered load circuit, such as the LED lights, over a range that may include dimming to a minimum of 1% of maximum illumination, or to a different minimum such as 10% of maximum illumination.

Table 1 lists illustrative parts that may be associated with the circuits shown in FIGS. 2 to 6:

TABLE 1

Illustrative parts that may be associated with circuits shown in FIGS. 2 to 6

| Part Description | Tag |
|---|---|
| FR-4 59.5*29.5*1.2 mm 12 Serial | |
| SMD rectifier diode, 1A/1000 V, SOD-123 | D1, D3 |
| Ultrafast Recovery Diode, ES1JW 1A/600 V SOD-123FL | D2 |
| SMD switching diode, 1N4148W, 0.15A/75 V, SOD-123 | D4, D5 |
| SMD rectifier diode bridge, 800 V 1A | BD1 |
| SMD regulator diode, 9.1 V/0.35 W (SOD-123) | ZD1, ZD10 |
| SMD regulator diode, 12 V ± 2%/MM1ZB12 0.5 W SOD-123 | ZD3 |
| X7R chip capacitor, 1 uF/50 V, ±10%, 125° C. (0805) | C1, C2, C7, C15 |
| X7R chip capacitor, 1 nF/50 V, ±10%, 125° C. (0805) | C4 |
| NPO chip capacitor, 100 pF/50 V_±5%_125° C. (0603) | C3, C8 |
| X7R chip capacitor, 100 nF/50 V, ±10%, 125° C. (0603) | C5, C6, C9, C10, C12 |
| X7R chip capacitor, 470 nF/50 V, ±10%, 125° C. (0603) | C11 |
| Chip capacitor, 33 nF/630 V ± 10% (1206) | C13 |
| X7R chip capacitor, 1 uF/50 V, ±10%, 125° C. (1206) | C14 |
| ¼ W SMD resistor, 5.9K ± 1%(1206) | R1 |
| ¼ W SMD resistor, 39K ± 1%(1206) | R2 |
| ¼ W chip resistor, 270K ± 1% (1206) | R5, R6 |
| ¼ W SMD resistor, 120K ± 1%(1206) | R22 |
| ⅛ W chip resistor, 47KΩ ± 1% (0805) | R7 |
| ⅛ W chip resistor, 20K ± 1% (0805) | R23, R24 |
| ⅛ W chip resistor, 5.1K ± 1% (0805) | R25 |
| ⅛ W chip resistor, 10R ± 1% (0805) | R26, R27 |
| 1/10 W chip resistor, 1K ± 1% (0603) | R3, R4, R14, R19, R21 |
| 1/10 W chip resistor, 51K ± 5%(0603) | R8 |
| 1/10 W chip resistor, 54.9K ± 1% (0603) | R15 |
| 1/10 W chip resistor, 91K ± 1%(0603) | R9, R11 |
| 1/10 W chip resistor, 330K ± 1%(0603) | R16 |
| 1/10 W chip resistor, 39K ± 1%(0603) | R12 |
| 1/10 W chip resistor, 100R ± 1% (0603) | R13, R17 |
| 1/10 W chip resistor, 2K ± 1%(0603) | R18 |
| 1/10 W chip resistor, 4.7K ± 1%(0603) | R20 |
| ½ W chip resistor, 100KΩ ± 5%(1210) | R10 |
| Chip IC BP8519C SOT23-5 RoHS | U1 |
| SMD operational amplifier IC, LM258(SO-8) | U2 |
| Chip regulator IC, LD1117A, 3.3 V, SOT-89 | U3 |
| Chip IC ME32S003AF6P7 SSOP-20 RoHS | U4 |
| SMD optocoupler LTV-356T-TP1-B 4-SOP | U5 |
| Chip N-MOSFET, UTC 5N60G-TN3-R, TO-252 | Q1, Q2 |
| Chip transistor, MMBTA06, 1GM(SOT-23) | Q3, Q4, Q5 |
| Slow-blow square fuse 3.15A300 V 8.5*8*4.5 12.7 hole pitch braid | F1 |
| Varistor Φ07 mm 270 V ± 10% 5P Tape | RV1 |
| X2 safety capacitor, 0.1 uF/305 V ± 10% P = 10 T = 5 | CX1 |
| Electrolytic capacitor, 1 uF/500 V ± 20% 105° C. Φ6.3*11 | EC1 |
| Electrolytic capacitor, 100 uF/25 V ± 20% 105° C. Φ6.3*11 Taping | EC2 |
| Plug-in color ring inductance, CKL0514/8.2 mH/J-CCA | L1 |
| Isolation transformer, H0602G L = 4 mH | T1 |
| 18# black Teflon wire length 200 half stripped 13/tin soaked 3 | L, K1 |
| 18# white Teflon wire length 200 half stripped 13/tin soaked 3 | N |
| 18# blue Teflon cable length 200 full stripping 11 soaking tin 3 | K2 |
| 22# pink Teflon wire length 320 Dipping tin 10 Dipping tin 3 | 0 V |
| 22# purple Teflon wire length 320 Dipping tin 10 Dipping tin 3 1 PC 10 V | 10 V |
| I-shaped inductor DR5X11 3 mH ± 10% | L2 |
| MCU firmware 0-10 V dimming module REV.A | |
| Any other suitable part | |

One skilled in the art will understand that the components in the circuits may be varied to achieve functionality in accordance with principles of the invention.

Figure 7:
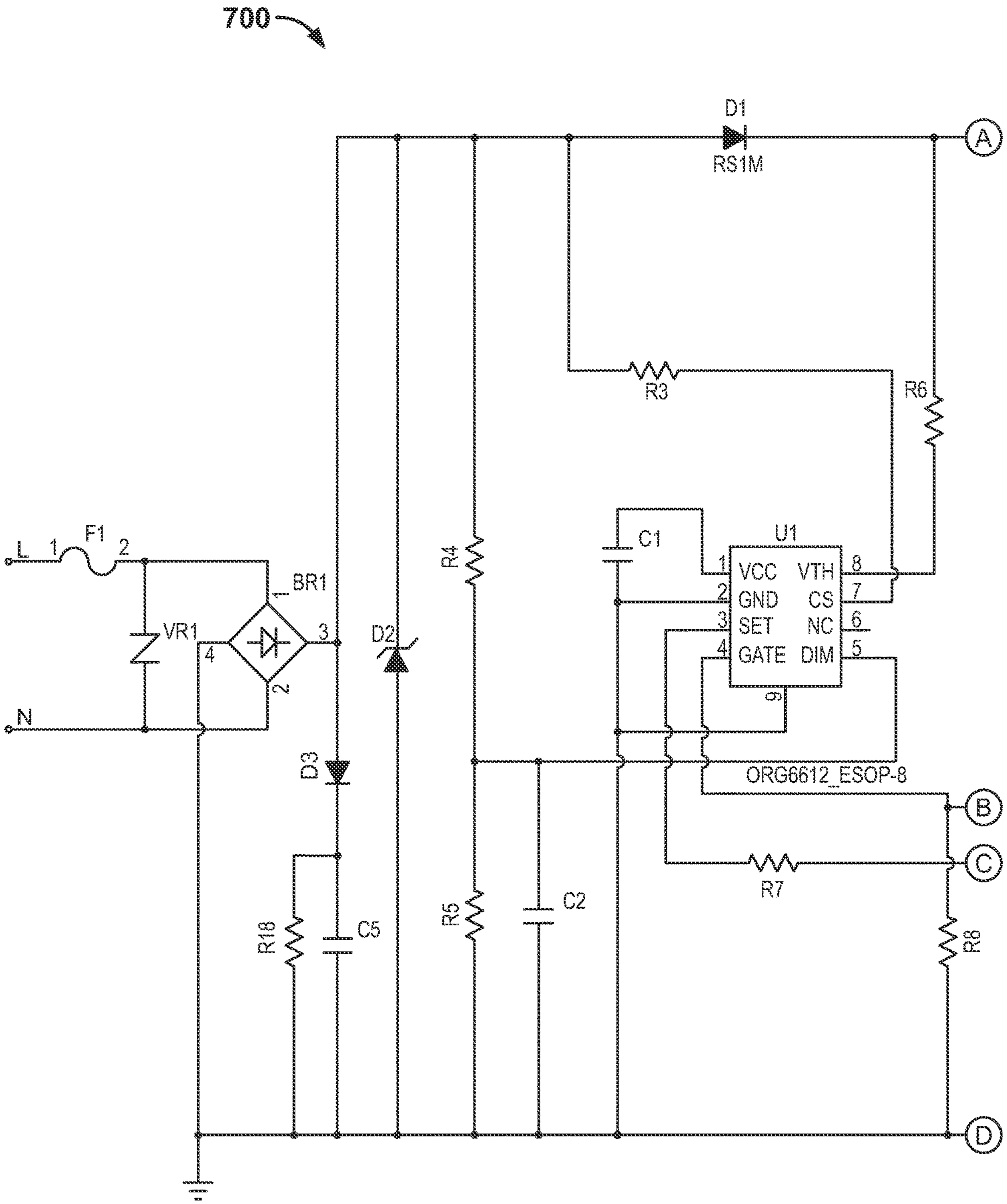
FIG. 7 shows schematically an illustrative load that may be dimmed in accordance with principles of the invention.
Figure 7:
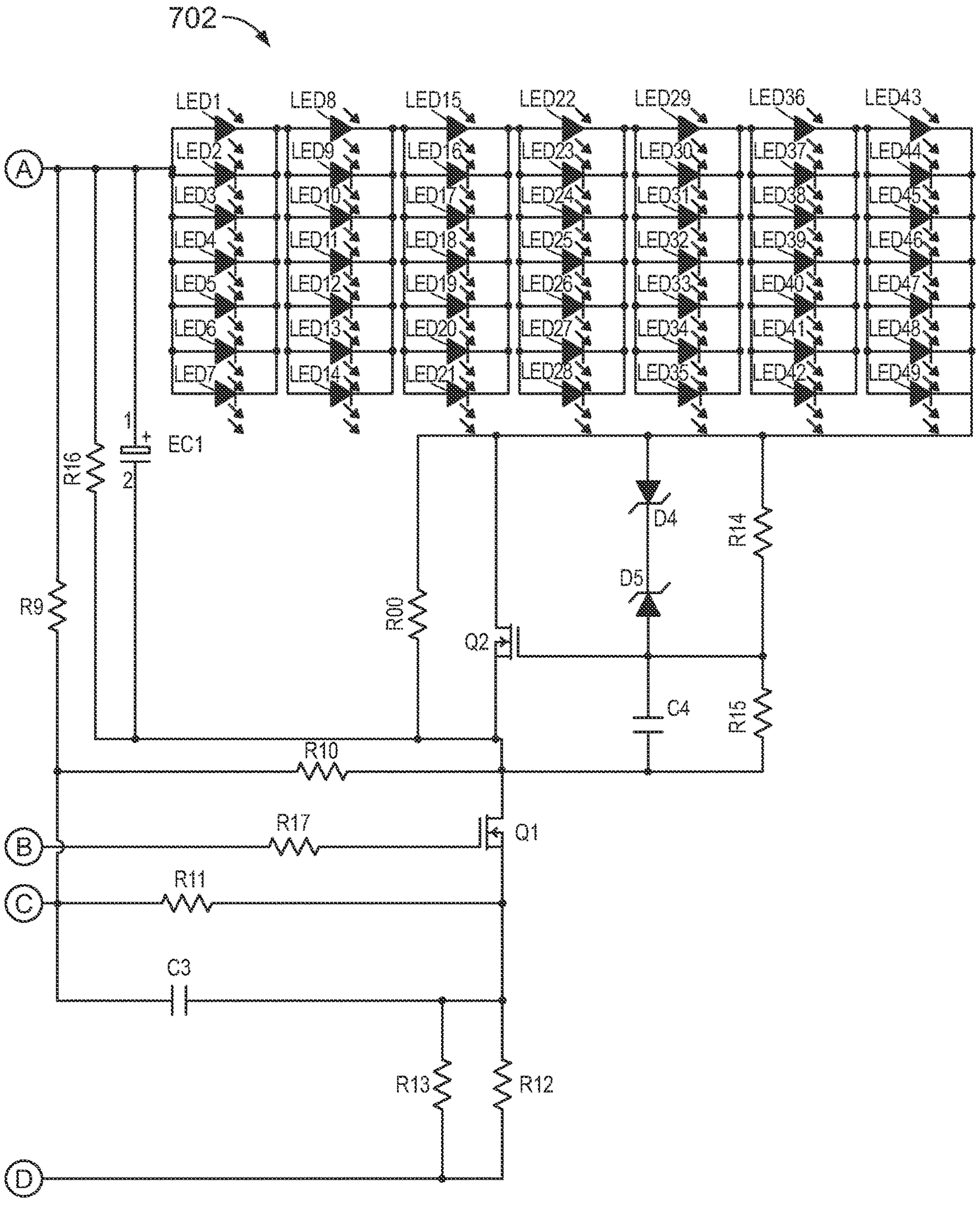

FIG. 7 shows illustrative circuitry 700 for an illustrative AC-powered load circuit that may be dimmed by a 0-10 V dimmer using the dimming apparatus in accordance with the disclosure. To power load 700, terminals L and N may be connected, for example, at 116 in FIG. 1 or at connector 210 in FIG. 2. Load 700 may include an array of LED lights 702 (such as an array of 44 LEDs). While load 700 may be powered by an AC voltage, the LED array 702 may operate in DC mode. Chip U1 in in FIG. 7 may control MOSFET transistors Q1, Q2. Q1 may limit current to the array using resistors R12 and R13 if the current exceeds a certain level (e.g., 100 mA).

The microcontroller in MCU circuit 130 may be programmed to control the dimming level of the AC-powered load circuit 116 relative to the dimming setting within the 0 to 10 V range that may be set, such as by a user, on 0-10 V dimmer 110. The dimming level may be controlled by programming the MCU of MCU circuit 130 to adjust a duty cycle of pulse-width modulation PWM2 134 that is supplied to MOSFET switch 114 based on a setting on the 0-10 V dimmer 110. A higher duty cycle may maintain MOSFET switch 114 on for a longer time to provide less dimming than would a relatively shorter duty cycle. The programmed adjustments to the duty cycle may vary.

Figure 8:
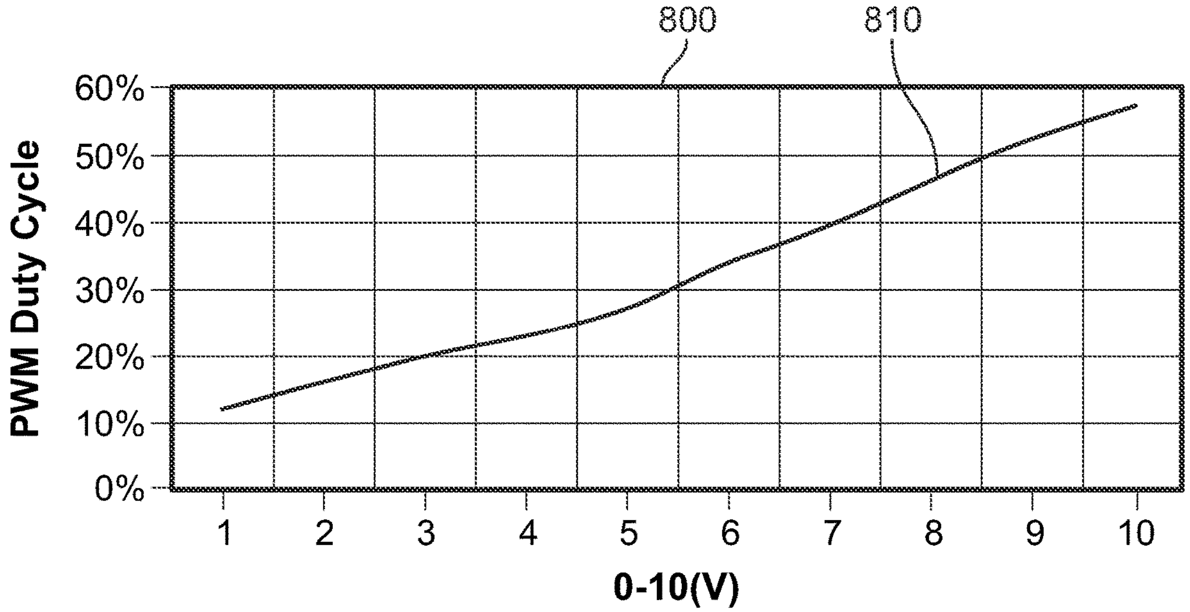
FIG. 8 shows illustrative information in accordance with principles of the invention.

FIG. 8 shows a graph 800 that illustrates one example how an MCU may be programmed to adjust a duty cycle of a PWM2 signal applied to a MOSFET switch based on a setting of 0-10 V dimmer. Line 810 shows that the programmed response over the 0 to 10 V range may be continuous so that the duty cycle may increase with each increase in the dimmer setting. This increase may be programmed to be linear or, as shown, the response may be non-linear. The programming of the microcontroller may also limit the range of voltages over which an adjustment to the 0-10 V dimmer is effective. For example, the setting of dimmer at a low end of the range to between, for example, 0-1 V, or between, for example, 0-0.1, may result in the MOSFET switch 114 remaining off and the load is not powered.

Figure 9:
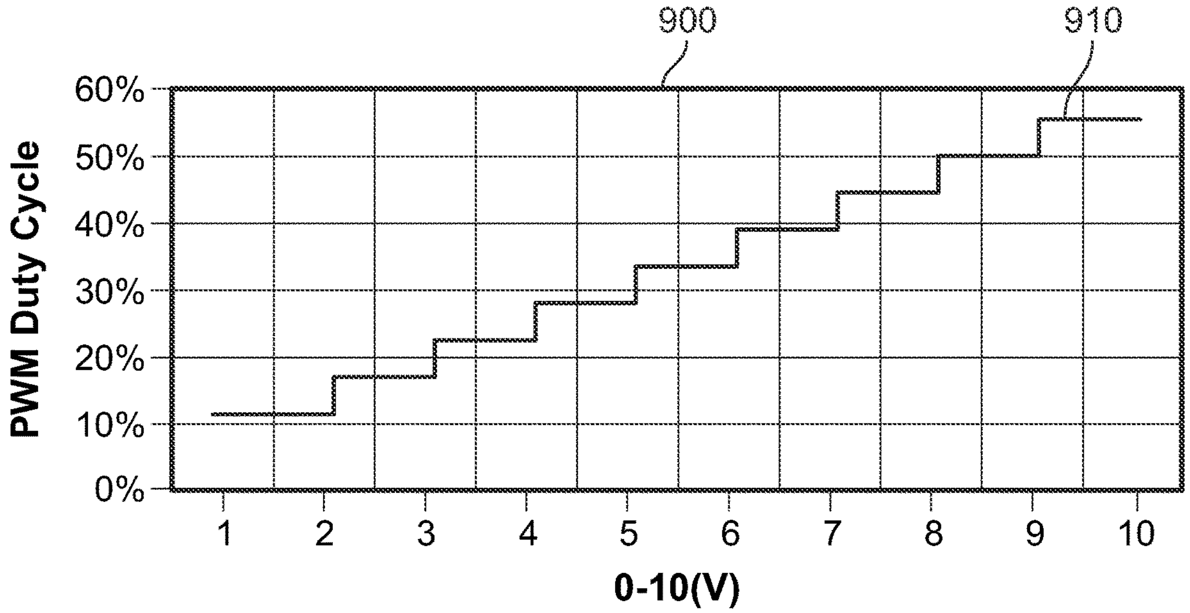
FIG. 9 shows illustrative information in accordance with principles of the invention.

FIG. 9 shows a graph 900 that illustrates a different example of how an MCU may be programmed to adjust a duty cycle of a PWM2 signal applied to a MOSFET switch based on a setting of the 0-10 V dimmer. In this example, the response may be stepped so that the dimming does not change with each incremental change in the dimmer setting, but may instead increase or decrease after the dimmer is adjusted up or down by a minimum increment. For example, an increase in the dimmer setting between 1 and 1.9 V may not alter the PWM2 duty cycle. However, an adjustment of the dimmer from 1 V to 2 V may increase the duty cycle by an MCU-specified amount. Likewise, the next increase in the duty cycle may only occur once the dimmer setting reaches 3 V. Thus, line 910 shows that the response may be a discontinuous and may be stepped response of the PWM2 duty cycle to an adjustment in illustrative graph of a stepped PWM duty cycle that may be output by an MCU control circuit dependent on a setting on a 0-10 V dimmer.

Figure 10:
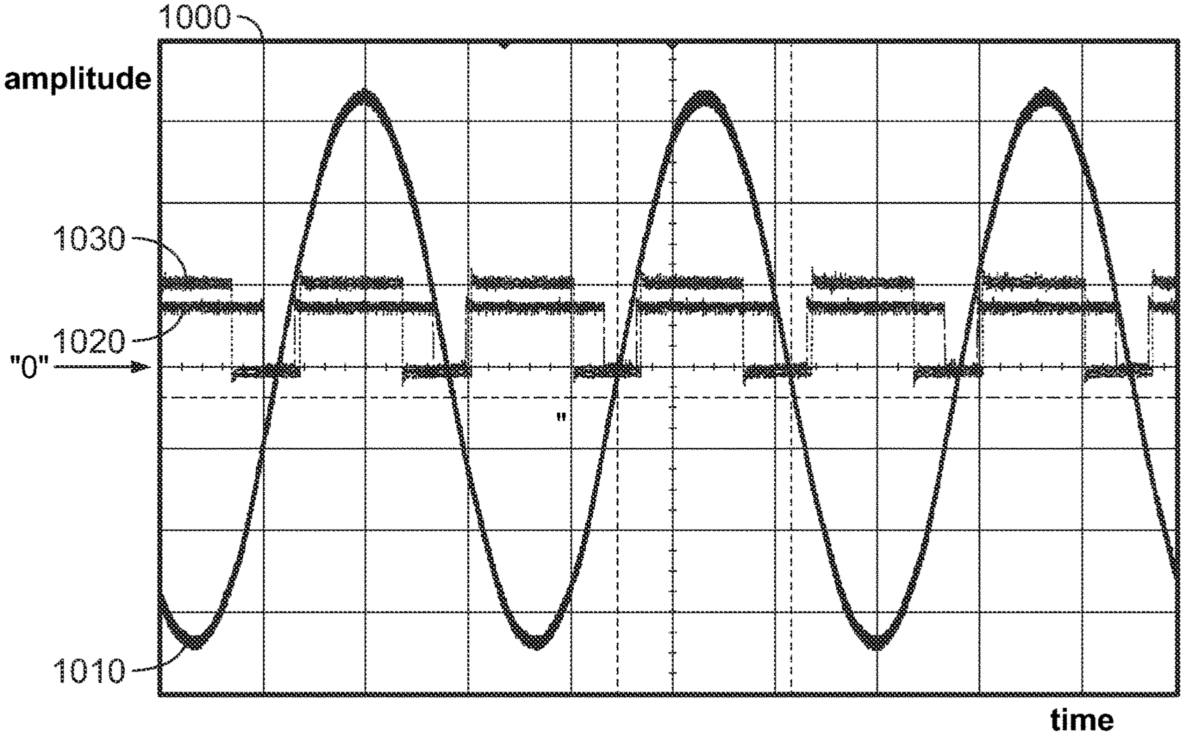
FIG. 10 shows illustrative information in accordance with principles of the invention.

FIG. 10 shows an illustrative graphical display 1000 that depicts an example of varying voltages as a function of time for AC input voltages, voltages output from a zero crossing voltage detection circuit, and voltages output by an MCU circuit based on the AC input voltages and voltages output from the zero crossing detection circuit.

An AC waveform 1010 that varies sinusoidally may be supplied by AC input voltage to a zero crossing voltage detection circuit. Zero crossing voltage detection circuit may output a pulse-width modulated wave PWM1 1020 that is supplied to an MCU circuit along with a signal that is based on a setting of an 0-10 V dimmer. The MCU circuit may be programmed to generate a second pulse-width modulated wave PWM2 signal 1030 having a duty cycle. PWM2 signal 1030 may be output to a MOSFET switch to control dimming of an AC-powered load circuit.

Figure 11:
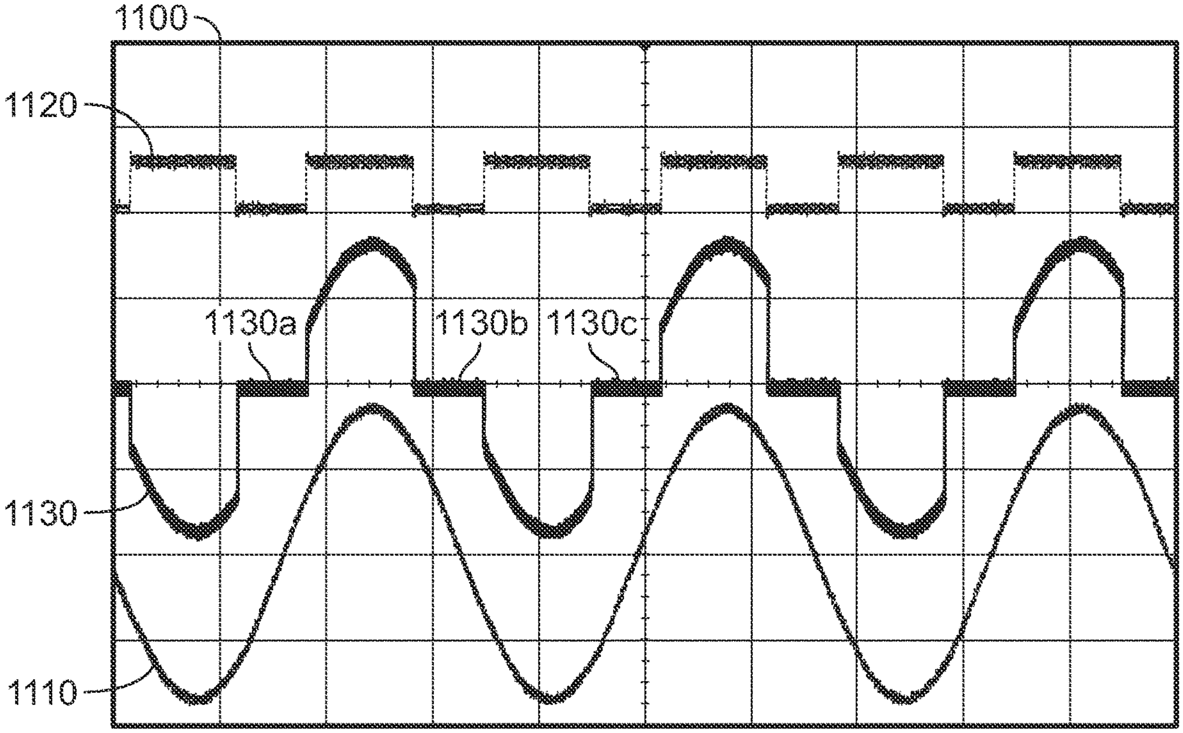
FIG. 11 shows illustrative information in accordance with principles of the invention.

FIG. 11 shows an illustrative graph 1100 that depicts an example of varying voltages as a function of time for AC input voltages, voltages output by the MCU circuit, and a waveform output from MOSFET switch that may be based on the AC input voltages and voltages output by the MCU circuit.

An AC waveform 1110 may be supplied by the AC input voltage to a zero crossing voltage detection circuit. The MCU circuit may be programmed to generate the PWM2 signal 1120 that may be output to dim the AC-powered load circuit based on a setting of the 0-10 V dimmer. The MOSFET switch may use the PWM2 signal 1120 to chop the AC waveform 1110 to generate a modified AC waveform 1130 in which the amplitude of portions of the waveform 1110 is set to 0, i.e., no power is supplied to the load, at certain intervals. Examples of those intervals are shown at 1130*a*, 1130*b*, 1130*c*. This may cause the AC-powered load circuit to be dimmed.

Figure 12:
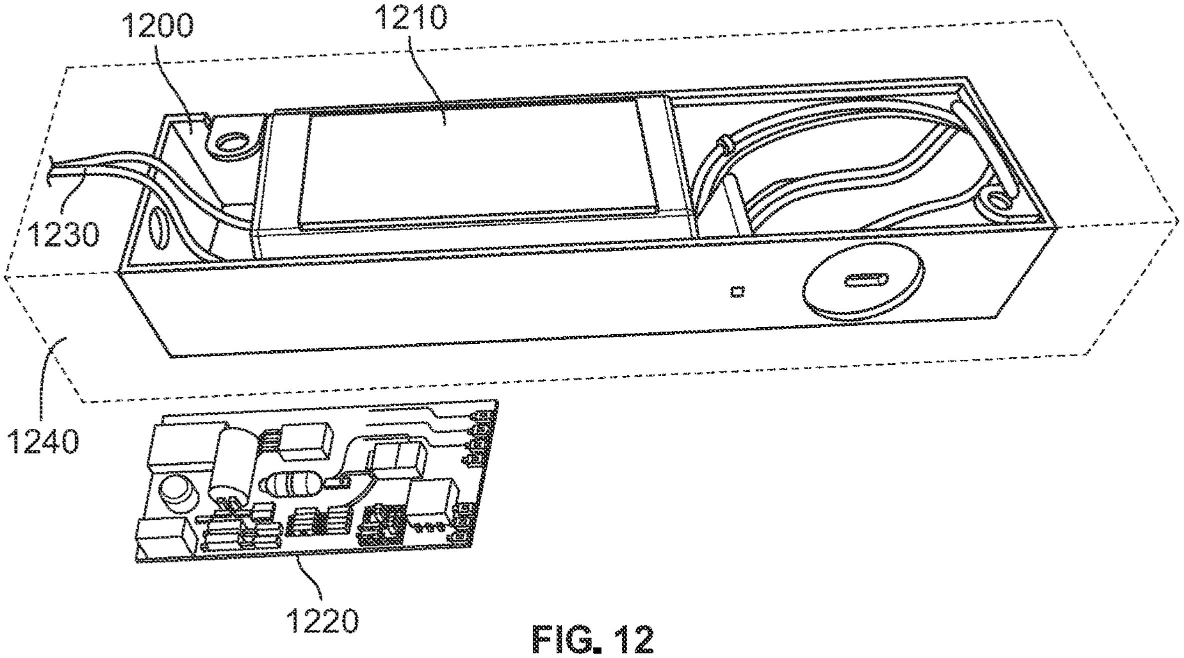
FIG. 12 shows an illustrative housing for the circuitry in accordance with principles of the invention.

FIG. 12 shows an illustrative housing 1200 in which the 0-10 V dimming apparatus in accordance with the disclosure may be partially or fully enclosed. Housing 1200 may include an enclosure 1210 in which a printed circuit board 1220 that supports one or more circuits for the dimming apparatus described herein may be placed. Electrical wiring 1230 may extend outside of housing 1200 to be electronically connected to a 0-10 V dimmer and an AC-powered load circuit, such as a fixture. Housing 1200 of dimming apparatus may be configured to be separately mounted, such as on or inside a wall or ceiling, or it may be covered by a fixture, such as within a canopy 1240 of a fixture that may cover housing 1200.

A dimming apparatus and methods for using the dimming apparatus to operate an AC-powered load circuit, which may include LED lights, are provided. The apparatus and methods may enable the use of a dimmer that outputs a DC voltage signal to control the AC-powered load circuit. Persons skilled in the art will appreciate that the present invention may be practiced by other than the described embodiments, which are presented for purposes of illustration rather than of limitation.

What is claimed is:

1. Apparatus comprising:

a voltage conversion circuit configured to generate a digital output based on a dimming level configured to be set on a 0-10 V dimmer that outputs a DC voltage control signal;

a switch that controls, based on the digital output, AC power supplied to a load circuit that is configured to receive AC power;

a microcontroller ("MCU") in communication with the voltage conversion circuit;

wherein:

the MCU includes:

a first input terminal configured to receive the digital output as a first input; and an output terminal configured to output a first pulse-width modulated ("PWM") signal, based on the digital output, to the switch; and the first PWM signal has a duty cycle that corresponds to the dimming level; and a voltage detection circuit that is configured to:

output a second PWM signal based on a voltage of the AC power that is input to the voltage detection circuit; and transmit the second PWM signal to the MCU;

wherein:

the MCU further includes a second input terminal configured to receive, as a second input, the second PWM signal from the voltage detection circuit; and the first PWM signal is based on the first input and the second input.

2. The apparatus of claim 1 further comprising a system voltage supply to supply power to:
the voltage conversion circuit; and
the MCU.

3. The apparatus of claim 2 wherein the system voltage supply is configured to supply power to the voltage detection circuit.

4. The apparatus of claim 2 wherein the voltage conversion circuit is configured to electrically isolate the 0-10 V dimmer from the system voltage supply.

5. The apparatus of claim 1 further comprising a main circuit that includes the switch, wherein the switch is configured for ON/OFF control of the AC power supplied to the load circuit.

6. The apparatus of claim 5 wherein the main circuit further includes an optocoupler configured to transmit the first PWM signal to the switch.

7. The apparatus of claim 5 wherein the main circuit is AC-powered.

8. The apparatus of claim 1 configured to:
receive the AC power comprising alternating current; and
divide the alternating current into three channels, including:
a first channel configured to provide power to the load circuit via the switch;
a second channel configured to provide power to a system voltage supply; and
a third channel configured to provide an AC signal to the voltage detection circuit.

9. The apparatus of claim 1 wherein the MCU is programmed to use the second PWM signal to synchronize the first PWM signal with the AC power.

10. The apparatus of claim 1 wherein the MCU is programmed to provide a correlation between dimming of the load circuit and the dimming level.

11. The apparatus of claim 10 wherein the correlation is linear.

12. The apparatus of claim 1 wherein the switch comprises a MOSFET switch that is controlled by the MCU to turn on or off based on the first PWM signal.

13. The apparatus of claim 12 wherein the MOSFET switch comprises a MOSFET tube that is configured to chop AC power supplied to the load circuit based on the duty cycle of the first PWM signal.

14. The apparatus of claim 1 wherein the voltage detection circuit is a zero-crossing voltage detection circuit.

15. The apparatus of claim 1 further comprising the load circuit.

16. The apparatus of claim 1 wherein:
the voltage conversion circuit is a 0-10 V voltage conversion circuit.

17. The apparatus of claim 1 wherein the load circuit comprises a fixture.

18. The apparatus of claim 17 wherein the fixture includes a DC device.

19. The apparatus of claim 17 wherein the fixture includes a light source.

20. The apparatus of claim 19 wherein the light source includes a light-emitting diode.

21. The apparatus of claim 19 wherein the load circuit includes lights.

22. The apparatus of claim 1 wherein the voltage conversion circuit comprises an A/D converter that is configured to generate the digital output by sampling the dimming level.

23. The apparatus of claim 1 further comprising a housing that encloses:
the voltage conversion circuit; and
the switch.

24. The apparatus of claim 1 configured to be located in a fixture canopy.

* * * * *